April 7, 1936.  C. F. DINLEY  2,036,261
APPARATUS FOR TREATMENT WITH SOLVENTS
Filed Oct. 1, 1932  6 Sheets-Sheet 1
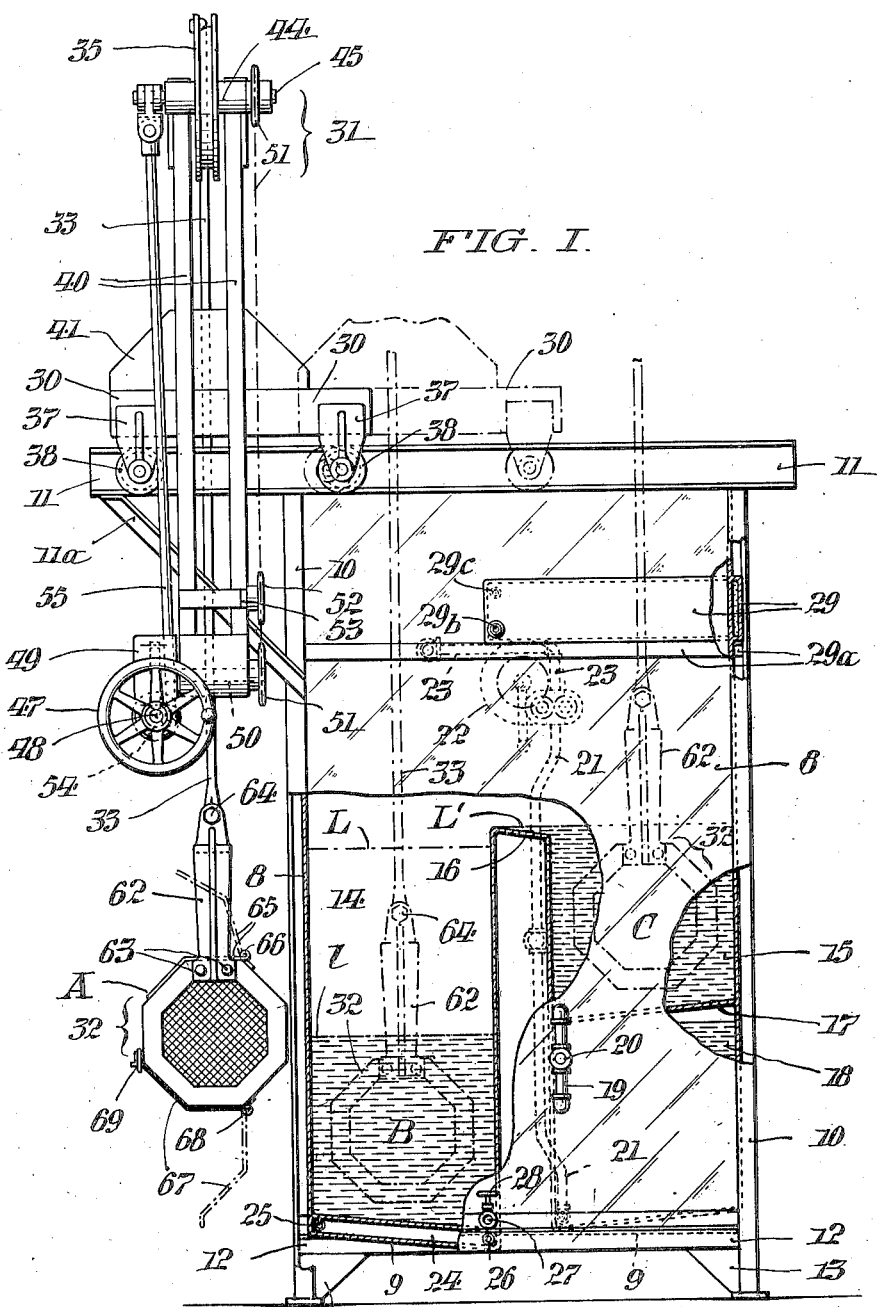

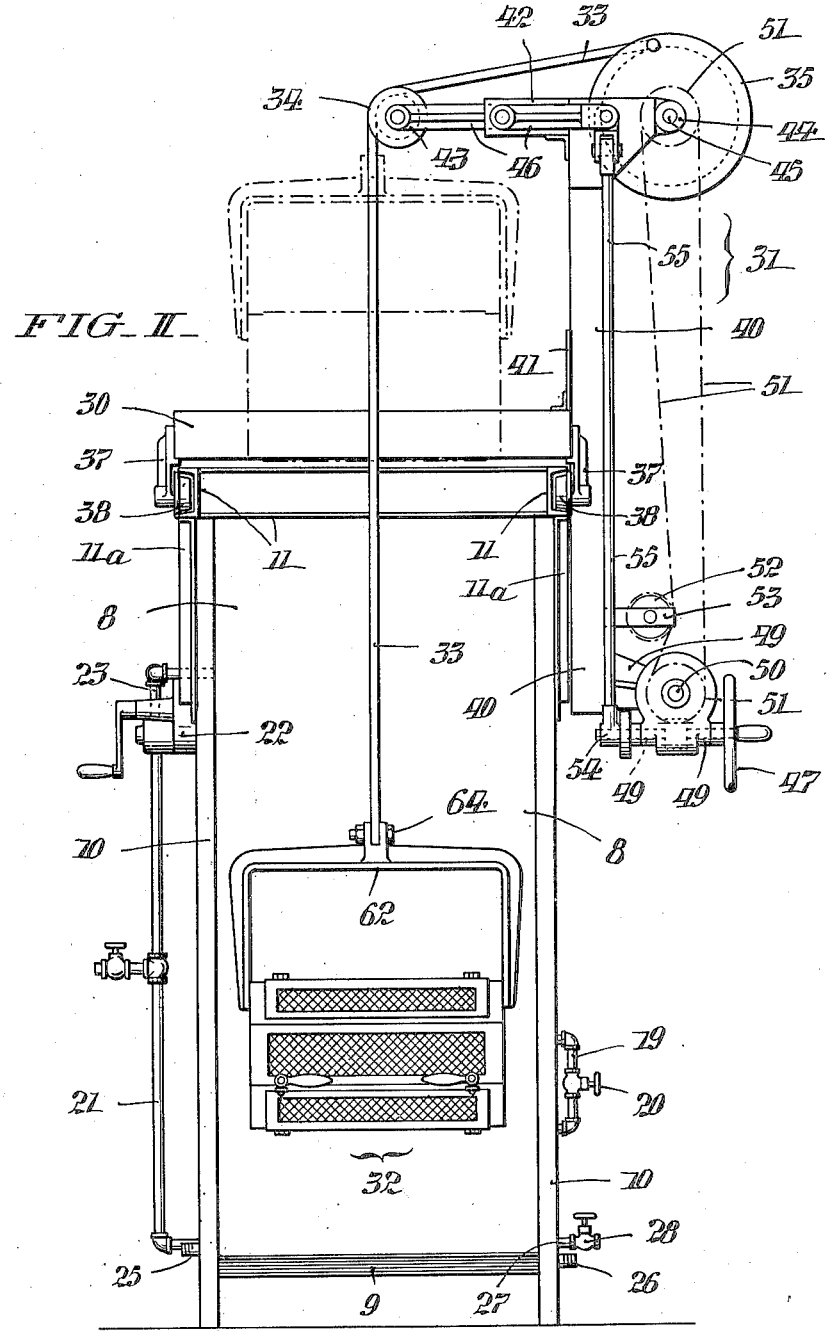

April 7, 1936. C. F. DINLEY 2,036,261
APPARATUS FOR TREATMENT WITH SOLVENTS
Filed Oct. 1, 1932 6 Sheets-Sheet 3
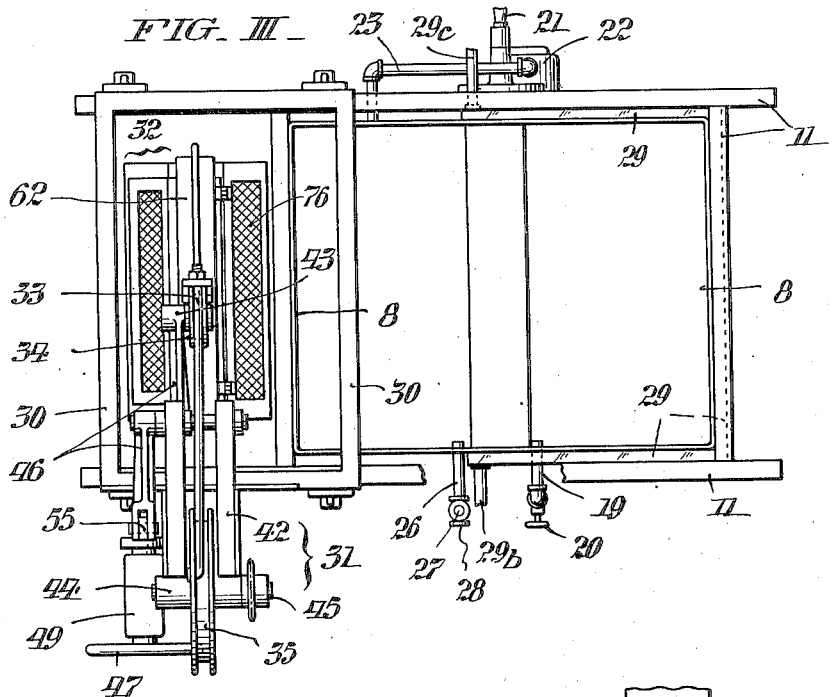
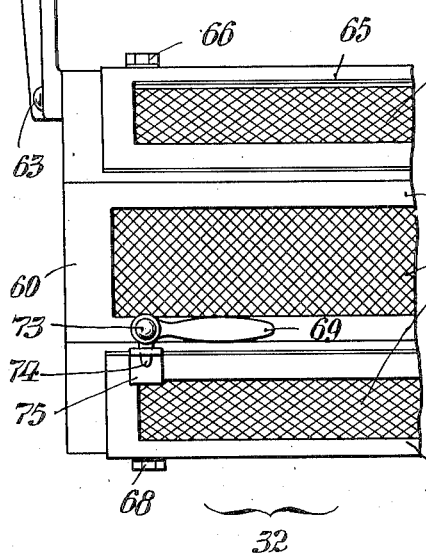
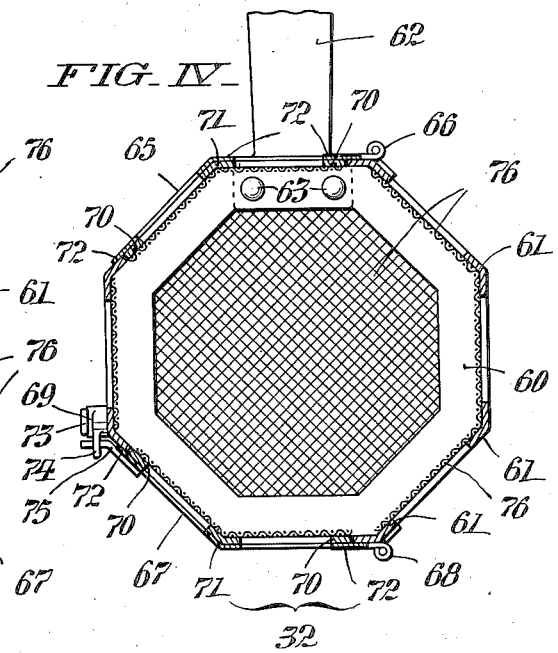

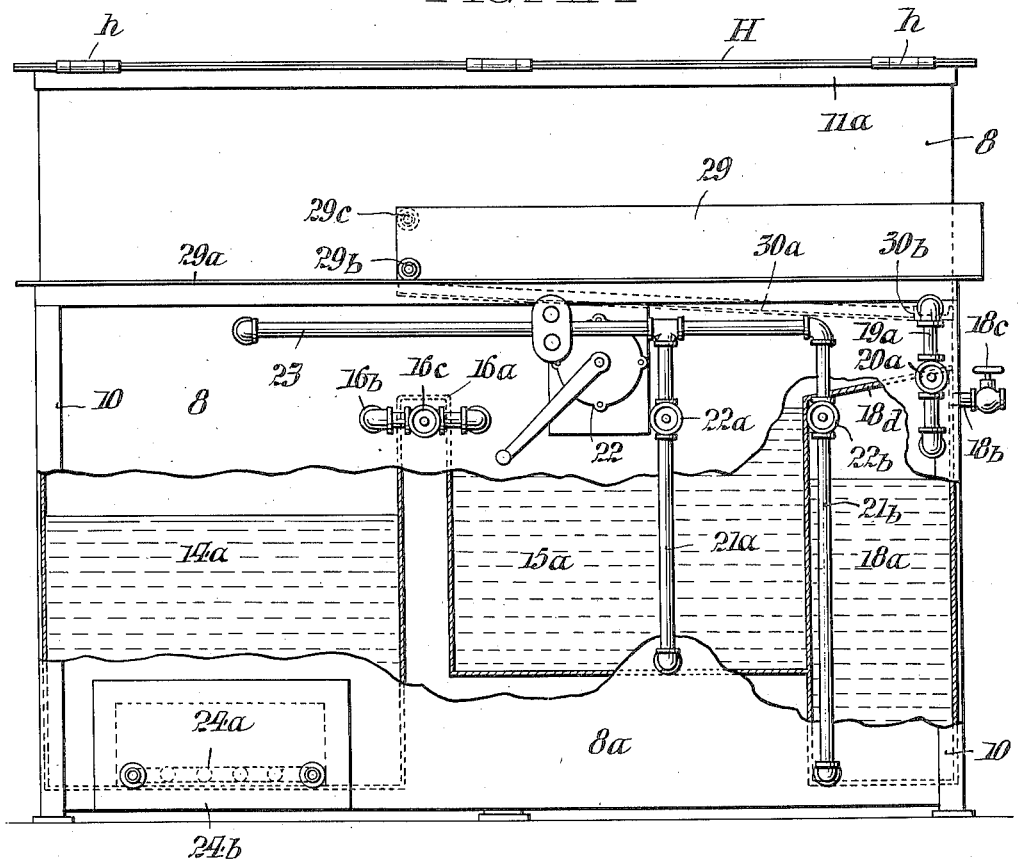
FIG. VI
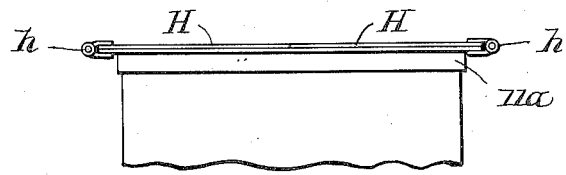
FIG. VII

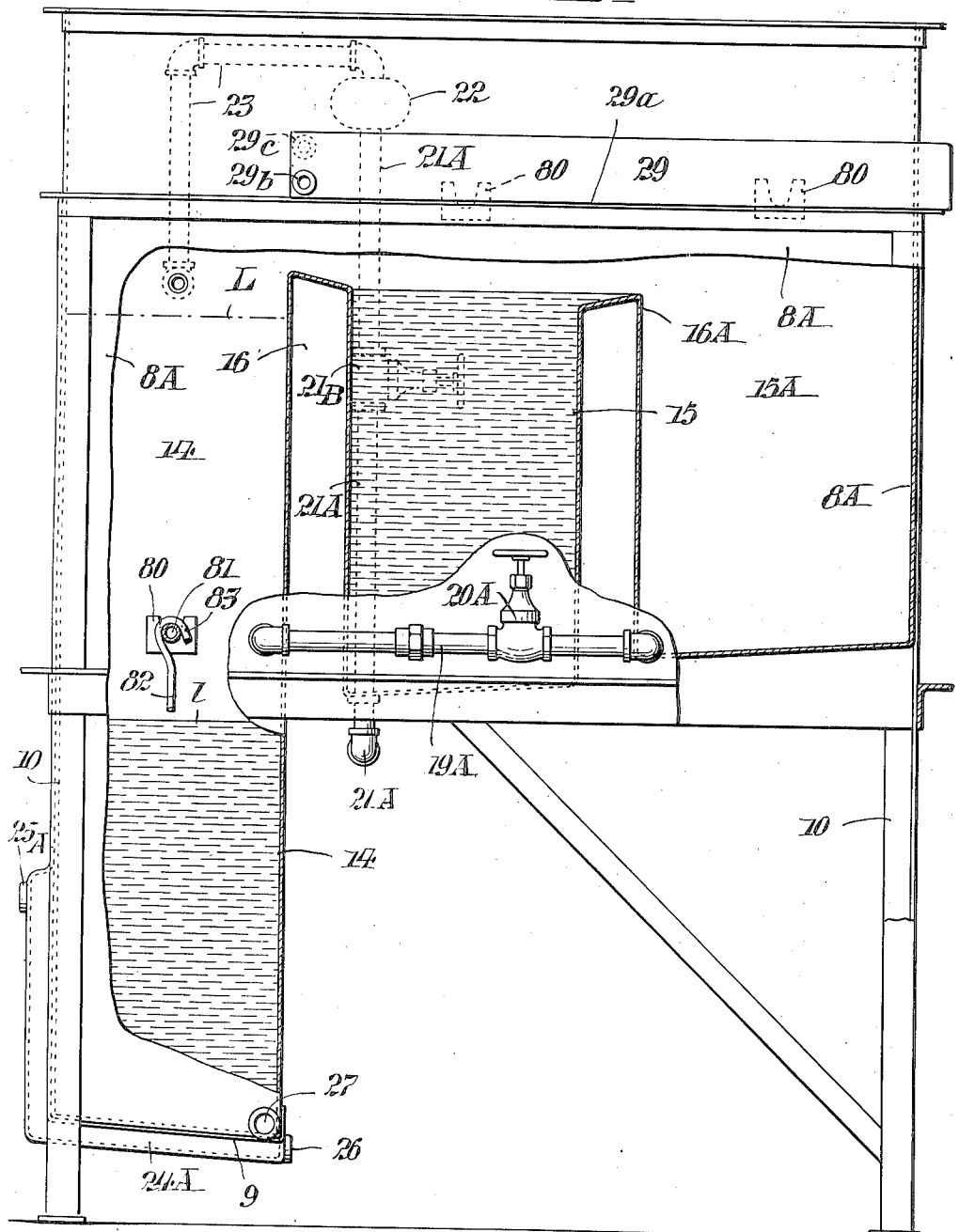

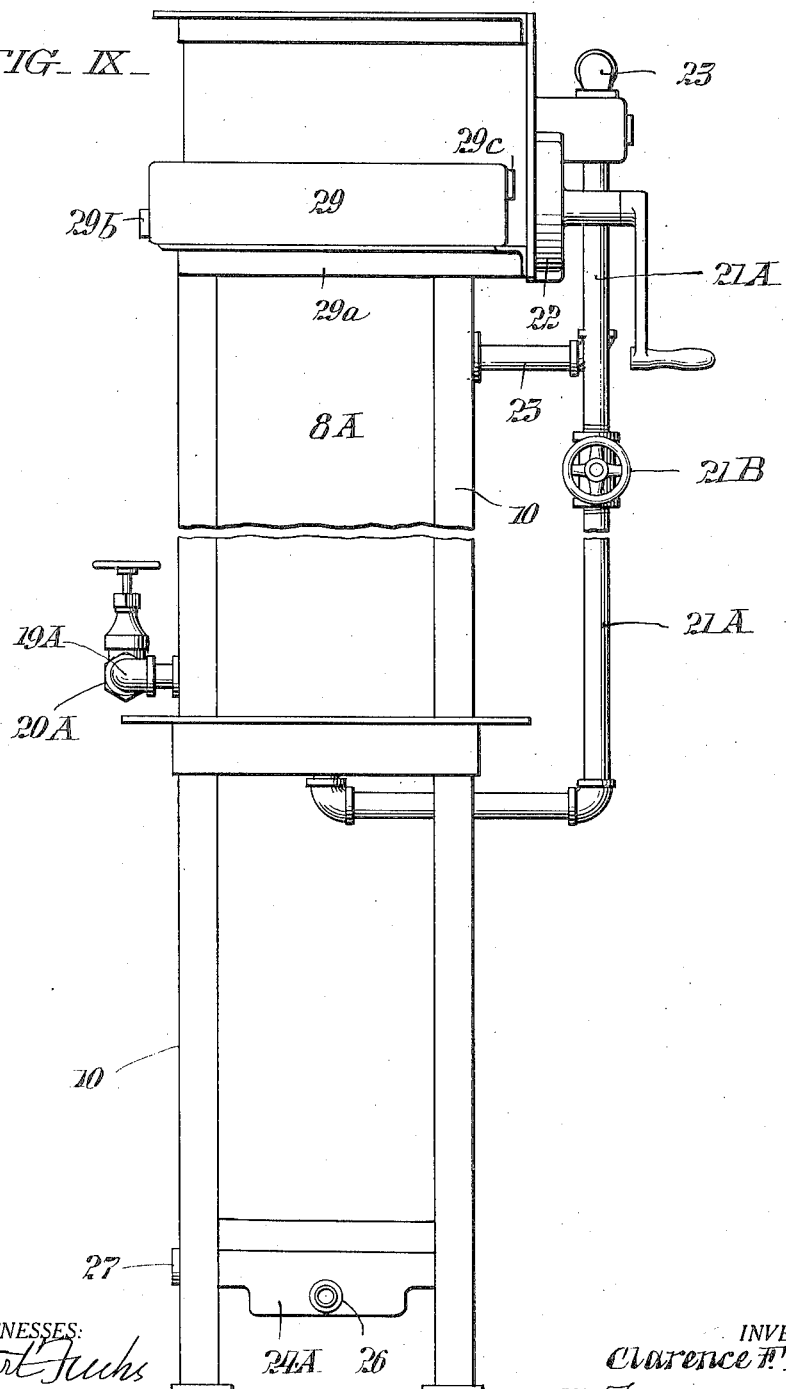

Patented Apr. 7, 1936

2,036,261

UNITED STATES PATENT OFFICE 2,036,261

APPARATUS FOR TREATMENT WITH SOLVENTS

Clarence F. Dinley, Detroit, Mich., assignor to James H. Bell, Philadelphia, Pa.

Application October 1, 1932, Serial No. 635,792

12 Claims. (Cl. 87—6)

My invention relates to treatment with solvents for such purposes as cleaning and degreasing, etc., and particularly to the use of volatile solvents; especially solvents whose vapors are heavier than air, such as benzine, benzol, and chlorinated solvents like carbon tetra chloride and trichlorethylene, whose vapors are uninflammable. My invention aims to provide a compact, convenient and efficient apparatus for this purpose, which though very simple (and easily operated by a single unskilled operator) will satisfactorily clean a great deal of work for the cleaning of which a large commercial demand exists. How these and other advantages can be realized through the invention will appear from my description hereinafter of several preferred forms of embodiment.

In the drawings, Fig. I is in part a side elevation and in part a vertical section of one form of apparatus convenient for my purpose.

Fig. II is a side elevation at right angles to Fig. I.

Fig. III is a plan view of the apparatus, with a broken away.

Fig. IV shows a cross-section of a basket container for the work to be treated, on a larger scale than Fig. I; and Fig. V is a corresponding fragmentary side view of one end of this container.

Fig. VI is a side view, similar to Fig. I, illustrating a somewhat different form of apparatus.

Fig. VII is a fragmentary end view, showing the upper portion of the apparatus of Fig. VI.

Fig. VIII is a side view, similar to Figs. I and VI, illustrating yet another form of apparatus; and Fig. IX is a side or end elevation at right angles to Fig. VIII, but on a somewhat larger scale, a portion being broken out to bring the height of the apparatus within the limits of the paper.

The several different forms of treating apparatus shown in the drawings all embody certain common features, as will appear from comparison of Figs. I, VI and VIII; viz.: They have a treating vessel or tank 8 that serves to exclude air, but is open upward for the introduction and removal of work; and they are provided with means affording separate wells or baths (14, 15; 14a, 15a; or 14, 15, 15A) in the vessel 8, wherein articles may be treated with liquid and/or vaporous solvent. As shown, the separate solvent wells are provided by partitioning (16, 16a, 16A) that permits liquid solvent to accumulate in one of the wells above its level in another, and to overflow over the partitioning from the one well to the other, as over a dam. (In Fig. VI there are pipe and valve connections 16b, 16c as an alternative means of overflow.) By heating means (24, 24a, 24A) associated with a well (14, 14a, or 14) receiving such overflow, liquid solvent therein may be heated and vaporized, while the overflowing well may be left cooler. Though the treating wells are open upward and readily accessible from above, yet solvent vapor arising from any of them is retained by suitable extension of the walls of vessel 8 upward above the wells, and by condensing the vapor from this upper part of the vessel, which is (externally) water jacketed at 29 for this purpose. The thus distilled and purified solvent is normally supplied to the cooler well above referred to, to accumulate therein and overflow into the heated or vaporizing well. To facilitate cleaning of the apparatus when necessary, a storage reservoir (18, 18a, 18A) is shown, to receive the distilled solvent, and also suitable provisions for transferring, returning, or draining liquid solvent from other parts of the apparatus to the vaporizing well.

As here shown, the apparatus comprises a treating vessel or enclosure in the form of a rectangular sheet metal tank 8 with bottom 9 sloping somewhat from either side or end toward the center. The tank 8 is supported by a framework of angle uprights or legs 10 at its corners, with their upper ends engaged under a rectangular frame of channels 11, 11 about the open top or mouth of the tank. The ends of the side channels 11 are shown projecting beyond the tank 8 and braced thereto by braces 11a. At or around the bottom corners of the tank is a horizontal framing of structural members 12, with their ends secured in the angles of the legs 10, which are braced thereto (and to the tank) by (gusset plate) braces 13. In the lower portion of the tank 8 are separate treating spaces or wells 14, 15 for treatment of the work with solvent, separated by a (hollow) vertical sheet metal partition or dam 16. The bottom of the well 14 is formed by the sloping tank bottom 9; that of the well 15 by a sloping sheet metal wall 17, considerably above the bottom 9. The space beneath the bottom 17 and inside the dam 16 affords a closed storage reservoir 18 of sufficient capacity to hold all the solvent in the apparatus. As here shown, there is a drainage pipe connection 19 from the bottom of the well 15 into the tank 18 controlled by a valve 20, and there is also a suction pipe connection 21 from the bottom of the tank 18 to a (crank-operated) hand pump 22.

(such as a gear pump) that delivers through a pipe 23 discharging through the side of the tank 8 into the well 14, preferably above the top of the dam 16—all for a purpose explained hereinafter. Solvent in the well 14 may be heated (and vaporized) by any suitable heating means, such as a steam jacket 24 on its bottom—shown as having inlet and outlet pipe connections 25, 26 at its diagonally opposite upper and lower corners. The wall 14 has a drainage outlet connection 27 at one of its lower corners, controlled by a valve 28.

Around the upper portion of the tank 8, above the well 15, is a cold-water-jacket condenser 29, shown as engaging subjacent external angles 29a on the tank sides: it has inlet and outlet connections 29b, 29c at the opposite tank sides, the former at the jacket bottom and the latter at its top. In the present instance, the condenser 29 is U-shaped in plan (Fig. III), extending across one end of the tank 8 and part way along the adjacent tank sides. The vapor evolved from the heated solvent in the well 14 accumulates and fills the tank 8 about to the mid-level of the condenser 29. Condensed by the condenser 29, the solvent drips and runs down into the well 15, which is thus supplied with the purified condensate, and kept full and comparatively cool. The excess overflows over the top of the partition 16 into the well 14, where it is vaporized, etc., indefinitely. As shown in Fig. I, the top of the partition or dam 16 slopes rather gently upward, in the direction of overflow, to its crest, to facilitate overflow of drops of water floating at the surface of the solvent in well 15. Such drops of water float partly submerged in the solvent in well 15,— something like ice-bergs—and the comparatively gentle slope of the top of the dam 16 allows the overflowing solvent to roll these waterdrops "up" the slope and over the crest of the dam. But for this, water condensing from the superjacent air in contact with the vapor in the vessel 8 would accumulate into a layer covering the top of the liquid solvent in the well 15, and this water layer would tend to waterspot the work treated in the well 15.

The things or work to be treated are first washed by immersion in the (boiling) hot solvent in the well 14, and then transferred to the well 15 and rinsed by immersion in the (cooler) purified solvent therein. The work may then be raised into the atmosphere of solvent vapor above the top of the dam 16, and kept there awhile to be further cleansed by "sweating" with pure solvent condensing on its surface—since its immersion in the rinse bath at 15 has cooled the work below the boiling point of the solvent. When such sweating ceases (owing to gradual heating up of the work to the temperature of the vapor), the work may be removed.

For handling or manipulating the work as just described, mechanism is shown for raising and lowering it and shifting it horizontally, comprising a carriage 30 movable back and forth across or adjacent the open top of the tank 8, and carrying an overhead supporting structure or "crane" 31. There is also a foraminous container or basket 32 for the work, attached to a flexible cable 33 extending up over a pulley 34 on the crane 31 to a winding drum 35 thereon. As shown in Fig. II, the carriage 30 has a horizontal open rectangular frame provided with bearing brackets 37 on which are mounted rollers 38 that run in guide ways afforded by the side channels 11 of the tank mouth frame already mentioned. The crane 31 has an upright 40 attached to one side of the carriage frame 30 (and braced thereto by a gusset plate 41), and extending both above and below the carriage, and a horizontal head member 42 projecting forward over the tank 8 and carrying bearings 43, 44 for mounting the pulley 34 and drum 35. The shaft 45 of the drum 35 is shown mounted directly in the head bearings 44. However, the pulley 34 is not mounted directly on the head 42, but on the forward end of a rock lever 46 itself fulcrumed or pivoted in the head member 42. For operating the drum 35, there may be provided a hand-crank-wheel 47 whose shaft 48 (mounted in bearing brackets 49 projecting rearward from the lower end of the upright 40) may be connected to the shaft 45 of the drum 35 through a shaft 50 (mounted in bearings on the brackets 49) worm-geared to the shaft 48, and a sprocket chain connection 51 from said shaft 50 to the drum shaft 45. For keeping the sprocket chain 51 taut there is shown an idle sprocket 52 adjustable sidewise of the chain in brackets 53 on the crane upright 40. As shown, the hand-wheel shaft 48 carries a crank 54 that is connected by a link-rod 55 to the rear end of the rocker 46 that carries the pulley 34; so that as the drum 35 is turned, the pulley 34 is vibrated up and down, and so likewise the work in the basket 32.

As shown in Figs. I, II, IV and V, the basket 32 has the form of a polygonal (octagonal) prism, and has angle-bar (basal) end frames 60 connected at their corners by angle bar longitudinals 61. A U-shaped lifting bail 62 is bolted to the end frames 60 at 63, and the cable 33 is attached to its middle, as by a bolt 64. The basket 32 (see Figs. IV and V) has a top opening, for receiving the work, that is normally closed by a cover 65 hinged at 66 to one of the longitudinals 61, and a bottom opening for discharging the work, normally closed by a dump bottom 67 hinged at 68 to one of the longitudinals 61 and held shut by one or more catches 69. As shown in Figs. IV and V, the top and bottom openings are each substantially coextensive with two adjacent sides of the basket prism, whose longitudinal corner members (61) that would otherwise span the openings are omitted. The cover 65 is outlined by a frame of flat bars 70, and has an intermediate (angle-bar) longitudinal 71 at the prism corner, in lieu of the omitted main frame member 61. The cover 65 may also have a sheet metal frame 72 welded over its frame 70 on the outside, and projecting beyond the latter to afford a flange or rabbet for seating on the main frame members 60, 61 around the top opening. The bottom 67 may be of similar construction, as indicated by like reference numerals applied to its various parts. The bottom catches 69 are shown in Fig. V as comprising angle levers pivoted on a frame member 61 at 73 and having catch arms 74 for engaging in notched clips 75 secured to the bottom 67, as well as handles for convenient operation. The end and side panel openings of the main frame and of the corner and bottom frames are covered with foraminous metal (such as woven wire) 76 welded against the inner surfaces of the framing, so as to retain even very small articles while affording the solvent (and its vapor) free access to the articles.

A mode of operation of the apparatus is as follows:

Initially, the well 14 is charged with liquid solvent to the "filling level" indicated by the dot and dash line L. Steam is supplied and passed through the jacket 24, and condensing water through the condenser 29. Thus the solvent in the well 14 is boiled and distilled over into the well 15, and the latter filled to overflowing at the level of the dot and dash line L'; while the solvent in the well 14 is reduced to the normal operating level indicated by the dot and dash line l.

With the parts in their full-line positions (A) of Fig. I, the bottom 67 of the basket 32 is closed and secured by its catch 69, and a batch of the articles or work to be treated is placed in the basket, and its cover 65 also closed. The hand wheel 47 is operated to rotate the drum 35 and thus lift the basket 32 above the top of the tank 8; and then the carriage 30 is pushed to the right (Fig. I) to the dot and dash position, and the hand wheel 47 is reversely operated to lower the basket 32 into the boiling hot solvent bath at 14. As the basket 32 descends, the crank 54 oscillates the rocker 46 up and down, thus vibrating or joggling the basket 32 up and down in the solvent, and tumbling and agitating its contents in the solvent to assure thorough contact of the latter with all surfaces of every article. When the basket 32 reaches its dot and dash line position (B) of total immersion in bath 14, it may be left stationary awhile, and the agitation of the solvent by boiling may be relied on to tumble the articles and assure thorough access of the solvent to all their surfaces; or the hand wheel 47 may be oscillated by hand sufficiently to jiggle the basket up and down without raising or lowering it materially.

When the work has thus been washed in the bath 14 as much as desired, the handwheel 47 may be operated to lift the basket 32 above the top of the dam 16, and the carriage 30 may be pushed further to the right; whereupon the handwheel 47 may be operated to lower the basket into the cooler, purer solvent bath at 15, with concurrent up and down jiggling as before. The basket 32 may be left stationary in the dot and dash position (C) of total immersion in bath 15; or it may be jiggled up and down therein to rinse the work more effectively, as in the bath 14.

When the work has thus been rinsed and cooled as much as desired, the handwheel 47 is operated to lift the basket 32 out of bath 15 (and above the top of the dam 16), into the vapor in the upper portion of the tank 8. Preferably, the carriage 30 is also pushed to the left to bring the basket 32 above its position (B), and the basket lowered somewhat (though not to the point of even partial immersion) to plunge the work more deeply in the upward stream of solvent vapor from the bath 14. Here the work is further cleaned by pure solvent condensing on its relatively cool surface.

When the work has heated up to the vapor temperature, or the vapor treatment has continued as long as desired, the handwheel 47 is operated to lift the basket 32 above the top of the tank 8; the carriage 30 is pushed further to the left; and the handwheel 47 is operated to lower the basket 32 back to its initial position (A). Thereupon the bottom 67 is released and the work dumped or dropped out of the basket; whereupon the bottom 67 may be closed and secured by its catches 69, and the cover 65 opened—ready for a repetition of the cycle with a fresh batch of work.

It will be understood, of course, that the cycle of operation described is illustrative, and can be greatly varied in practice: e. g., for rough cleaning of very dirty work, only washing in the bath 14 may be employed; or for work with very little dirt or grease on it, bath 14 may be skipped, and treatment may start in the bath 15—with or without subsequent vapor treatment, according to the thoroughness of cleansing desired.

When the solvent in baths 14 and 15 has become so contaminated with dirt and grease that further satisfactory cleaning therewith is impossible, it may be purified in the apparatus as follows:

The supplies of steam and water to jackets 24 and 29 continuing, valve 20 is opened and the solvent in well 15 is drained into the storage reservoir 18, whereupon the well 15 may (if necessary) be cleaned. The pump 22 is operated to pump the solvent from reservoir 18 into well 14, which then contains all the solvent in the apparatus. The solvent is boiled in well 14 and all distilled over into well 15. Thereupon steam may be shut off (if desired) from jacket 24 and well 14 thoroughly cleaned. Then pump 22 is used to return all the solvent to well 14—after (or before) which valve 20 is closed, and steam (if previously shut off) is turned on again into jacket 24. As soon as sufficient solvent has distilled over into well 15, the apparatus is ready for resumption of cleaning operations.

The cleaning cycle may, of course, be varied: e. g., if solvent bath 15 and well 14 do not require cleaning, the steam may be left on after opening valve 20 until all the solvent in well 14 has distilled over and drained into reservoir 18; whereupon steam may be shut off, well 14 cleaned, all solvent pumped from reservoir 18 into well 14, valve 20 closed, and steam turned on again.

The apparatus shown in Figs. VI and VII is of squattier proportions than that of Figs. I-III, being specially adapted for treating articles or objects of relatively small height as compared with their horizontal dimensions. The well or chamber 14a where the solvent is heated and vaporized is only moderately deeper than its rinsing well or chamber 15a, instead of having double the depth and capacity as in Fig. I. The heater for the solvent in the well 14a is shown as a horizontal serpentine steam pipe 24a mounted on a removable cover 24b secured over an opening in the side of the tank 8a. The storage reservoir tank 18a for cleaning purposes is located alongside the rinsing well 15a, instead of beneath it as in Fig. I, though it extends down below the bottom of the well 15a to afford ample capacity. From the top of the tank 18a there is an air vent pipe 18b controlled by a valve 18c to keep it from becoming airbound against inflow of solvent. The normal liquid level in the rinsing well 15a may be determined by overflow through a pipe 16b equipped with a control valve 16c, rather than by overflow over the dam 16a.

The suction connection 21 of the hand pump 22 has separate branches 21a, 21b to the well 15a and to the reservoir 18a, respectively controlled by valves 22a, 22b, respectively. Beneath the level of the (external) horizontal U-condenser 29 is an internal U-trough 30a formed by a U-section secured (welded) to the tank sides, and sloping toward the end wall of the tank 8 above the reversely sloping top 18d of the reservoir tank 18a. Ordinarily, condensed solvent accumulating in the trough 30a overflows from the (horizontal) portion 30b of the trough 30a on the end wall of the tank 8a and runs off the sloping reservoir top 18d into the rinsing well 15a, which is thus replenished with pure, clean, relatively cool solvent. The extension of the condensing water jacket 29 over or around the top of the reservoir tank 18a affords more ample condensing surface. Solvent from the trough 30a can also (alternatively) be drained into the reservoir 18a when desired, by means of a connection 19a controlled by a valve 20a.

The tank 8a is shown provided with half-covers H, H hinged at h, h to the top angles 11a, 11a on its longitudinal sides (Fig. VII); these may be closed to exclude air and obviate or minimize loss of solvent when the latter is being boiled for purification.

Various parts and features are marked on Figs. VI and VII with the same reference characters as in Figs. I–III, as a means of dispensing with repetitive description, and various accessories shown in Fig. I are omitted from Fig. VI. The operation is substantially the same as described in connection with Figs. I–III; but the following points may be particularly noted.

Ordinarily, solvent overflows from the rinse well 15a into the well 14a through the pipe 16b, as already mentioned; but when work is to be rinsed in the well 15a, the valve 16c is temporarily closed, so as to prevent solvent equal to the displacement of the work from overflowing at 16b, which might leave too little solvent in the well 15a to properly rinse the next piece of work. When it is desired to clean the apparatus, the covers H, H are closed, the valve 22b is closed, the valves 22a, 20a (and 18c) are opened, and all the solvent is pumped from the well 15a into the well 14a; and thus it is vaporized and all distilled over into the reservoir 18a and well 15a— if the latter be required to hold part of it. Then the steam is shut off from the coils 24a, and the covers H, H are opened and the well 14a cleaned out. After this, the valves 20a, 22a are closed and the valve 22b opened, and the purified solvent is all pumped back into the well 14a, ready for resumption of operation.

The form of apparatus shown in Figs. VIII and IX differs from that of Figs. I–III principally in the provision of an additional treating chamber or well 15A, which may be used for an additional, final liquid rinse, or, preferably, for vapor treatment, and may also serve as a storage reservoir (like 18 in Figs. I–III) for cleaning the solvent in the apparatus when contaminated with dirt and grease. Various parts and features of this apparatus are marked with the same reference characters as the corresponding ones in Figs. I–III, as a means of dispensing with repetitive description. It will also be understood that various accessories shown in Figs. I–III are omitted for greater clearness of illustration of more distinctive features, including the carriage 30, crane 31, etc., etc.

As here shown, the vapor treating well 15A is separated from the rinsing well 15 by a partition or dam 16A similar to the dam 16, but not so high, so that the overflow from well 15 is over this dam 16A into the well 15A, instead of over dam 16 into well 14. Liquid solvent thus overflowing into well 15A drains back into well 14 through a pipe 19A controlled by a valve 20A, as well as solvent dripping or running down from the condenser 29 directly into well 15A. The suction pipe 21A of the pump 22 draws directly from the bottom of rinse well 15, and is controlled by a valve 21B. The steam jacket 24A for heating solvent in well 14 extends up one side wall of the latter, as well as over its bottom 9, and the steam supply or inlet connection 25A is into the upper end of this vertical portion of the jacket 24A. The sides of the tank 8A are shown provided with V-sockets 80 for cross-rods 81 from which work-supporting racks 82 may be suspended by their hooks 83—i. e., when the carriage 30, crane 31, etc., etc., of Figs. I–V is not used. This apparatus is especially well adapted for cleaning metal work that is to be electro-plated; and when it is used for this purpose, the racks 82 may be bakelite-insulated plating racks, which may be transferred with the work directly from this cleaning apparatus to the plating bath.

In operation, vapor from the bath 14 fills the chamber 15A, as well as the interval above it up to the level determined by the condenser 29. Work may go first into the washing bath 14; then into the rinse bath 15; and then into the vapor bath or chamber 15A, where it may undergo a final stage of cleaning by vapor condensing on it, as explained in connnection with Figs. I–III.

When contamination of the solvent in wells 14 and 15 with dirt and grease becomes too great for further satisfactory cleaning therewith, valve 20A is closed and pump 22 is used to return the solvent from well 15 into well 14, which it fills about to the filling level L (Fig. VIII) i. e., all the solvent in the apparatus is now in well 14. This solvent in well 14 is then boiled and distilled over into wells 15 and 15A, until well 14 is empty. Well 14 is cleaned (after shutting off the steam, if necessary); whereupon valve 20A is opened and the solvent in well 15A is drained back into well 14, filling it to the normal working level l. In this solvent-cleaning cycle, well 15a corresponds to the reservoir 18 of Figs. I–III. The apparatus is now ready for resumption of operations, as soon as the steam (if shut off) is turned on again.

The apparatus shown in Figs. VIII and IX offers certain advantages over that of Figs. I–III, VI and VII: e. g., the progress of work through the apparatus is only in one direction, without need for any return from rinse bath 15 or vapor bath 15A back over washing bath 14, so that three "racks" or batches of work may be in the apparatus at once without causing any difficulty or complications in operation. The apparatus need not be so deep vertically as that of Figs. I–III to provide for convenient vapor cleaning. The stages to be employed and the needful duration of each stage depend entirely on the nature of the work to be dealt with: especially the final vapor treatment, whose proper and possible duration depends on the mass of the work, since this influences the length of time in which it will heat up to the vapor temperature.

Having thus described my invention, I claim:

1. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other and also affording a solvent-vapor-treating well in said vessel draining into one of the aforesaid wells, each of said wells being adapted to receive the work, and also provided with means above said wells for retaining and condensing solvent vapor evolved in the vessel, and for thereby supplying said overflowing well with liquid solvent.

2. Apparatus of the character described, for treating things or work therein with volatile solvent whose vapor is heavier than air, comprising an air-excluding treating vessel open upward for introduction and removal of work, and provided with means affording solvent wells in said vessel, one higher than another, and also affording a solvent-vapor-treating well in said vessel draining into the lower of the aforesaid wells and receiving overflow from the aforesaid higher well, each of said wells being adapted to receive the work, and also provided with means above said wells for retaining and condensing solvent vapor evolved in the vessel and for thereby supplying said overflowing well with liquid solvent, and means for heating and vaporizing liquid solvent in the well into which said vapor-treating well drains as aforesaid.

3. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other, and also affording a solvent vapor-treating well in said vessel draining into said other well, each of said wells being adapted to receive the work, and also provided with means above said wells for retaining and condensing solvent vapor evolved in the vessel and for thereby supplying said overflowing well with liquid solvent, and with means for pumping solvent from said overflowing well into said other well.

4. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other, each of said wells being adapted to receive the work, and also provided with means above said wells for retaining and condensing solvent vapor evolved in the vessel and thus preventing its overflow from the apparatus, and for thereby supplying said overflowing well with liquid solvent, and means for heating and vaporizing liquid solvent in the well receiving the overflow as aforesaid while leaving the overflowing well cooler, thus tending to obviate evaporation of solvent from the overflowing well and so promote flow of solvent vapor from the other well upward and toward the overflowing well.

5. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other, each of said wells being adapted to receive the work, and also provided with means above said wells for retaining and condensing solvent vapor evolved in the vessel and thus preventing its overflow from the apparatus and supplying said overflowing well with liquid solvent; a storage reservoir for also receiving liquid solvent thus distilled, so that the contents of said well receiving the overflow as aforesaid may be distilled down to permit of its being cleaned out while the excess of purified distillate is meanwhile held in said storage reservoir; and means for returning liquid solvent from said storage reservoir to said other well.

6. Apparatus of the character described, for treating things or work therein with volatile solvent whose vapor is heavier than air, comprising an air-excluding treating vessel open upward for introduction and removal of work, and provided with means affording separate solvent wells in said vessel, one higher than another and normally discharging thereinto, each of said wells being adapted to receive the work, and also provided with means above said wells for retaining and condensing solvent vapor evolved in the vessel, and thus preventing its overflow from the apparatus and also supplying purified distilled liquid solvent to be received in said higher well; means for heating and vaporizing liquid solvent in the lower well, while leaving the higher well cooler, and a storage reservoir for also receiving the purified liquid solvent distilled from said lower well by the operation of said heating and condensing means, so that the contents of said lower well may be distilled down to permit of its being cleaned out while the resultant purified distillate is meanwhile held in said higher well and said reservoir; and means for returning this purified liquid solvent from the higher well and from said reservoir to the vaporizing well.

7. Apparatus of the character described, for treating things or work therein with volatile solvent whose vapor is heavier than air, comprising an air-excluding treating vessel open upward for introduction and removal of work, and provided with means affording separate solvent containers or wells in said vessel, one higher than another and normally discharging thereinto, each of said wells being adapted to receive the work, and also provided with means above said wells for retaining and condensing solvent vapor evolved in the vessel and thus preventing its overflow from the apparatus; a storage container or reservoir to receive liquid solvent thus distilled; and means for pumping liquid solvent from one of the other containers aforesaid to the lower well, and for also returning liquid solvent from the other container in question to said lower well.

8. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other, each of said wells being adapted to receive the work, and also provided with means above said wells for retaining and condensing solvent vapor arising from any of them and thus preventing its overflow from the apparatus, and for thereby supplying the overflowing well with purified liquid solvent; a storage reservoir for also receiving the condensed and purified liquid solvent, so that the contents of said well receiving the overflow as aforesaid may be distilled down to permit of its being cleaned out while the excess of purified distillate is meanwhile held in said storage reservoir; and means for pumping up liquid solvent from either said overflowing well or said storage reservoir over into the other well.

9. Apparatus of the character described, for treating things or work therein with volatile solvent whose vapor is heavier than air, comprising an air-excluding treating vessel open upward for introduction and removal of work, and provided with means affording separate solvent wells in said vessel and providing for accumulation of liquid solvent in one of said wells higher than the solvent level in another and overflow of excess from the one well into the other, each of said wells being adapted to receive the work, and also provided with means above said wells for retaining and condensing solvent vapor arising from any of them, and thereby preventing its overflow from the apparatus and normally supplying the overflowing well with purified liquid solvent; a storage reservoir for purified solvent, and means for diverting the condensed solvent into said storage reservoir, so that the contents of said well receiving the overflow as aforesaid may be distilled down to permit of its being cleaned out while the excess of purified distillate is meanwhile held in said storage reservoir; and means for pumping up liquid solvent from either said overflowing well or said storage reservoir over into the other well.

10. Apparatus of the character described, for treating things or work therein with volatile solvent whose vapor is heavier than air, comprising an air-excluding treating vessel open upward for introduction and removal of work, and provided with means affording separate solvent wells in said vessel, one higher than another and normally discharging thereinto, each of said wells being adapted to receive the work, and also provided with a storage reservoir under the higher well for receiving liquid solvent therefrom, and with means above said wells for retaining and condensing solvent vapor evolved in the vessel and thus preventing its overflow from the apparatus, and for thereby supplying the higher well with purified solvent, and means for the transfer of liquid solvent from said storage reservoir to one of the wells.

11. Apparatus of the character described, for treating things or work therein with volatile solvent whose vapor is heavier than air, comprising an air-excluding treating vessel open upward for introduction and removal of work, and provided with means affording separate solvent wells in said vessel, one higher than another and normally discharging thereinto, each of said wells being adapted to receive the work, and also provided with a storage reservoir under the higher well for receiving liquid solvent therefrom, and with means above said wells for retaining and condensing solvent vapor evolved in the vessel and thus preventing its overflow from the apparatus, and for thereby supplying the higher well with purified solvent, and means for pumping up liquid solvent from said storage reservoir over into said lower well.

12. Apparatus of the character described, for treating things or work therein with volatile solvent whose vapor is heavier than air, comprising an air-excluding treating vessel open for introduction and removal of work, and provided with means including a dam affording separate solvent wells in said vessel and providing for accumulation of liquid solvent in one of said wells higher than the solvent level in another and overflow of excess from the one well over said dam into the other, the top of said dam sloping gently upward, in the direction of overflow, to its crest, and also provided with means above said wells for condensing solvent vapor evolved in the vessel and thereby supplying the overflowing well with liquid solvent.

CLARENCE F. DINLEY.